(12) United States Patent  
Luc et al.

(10) Patent No.: US 7,104,728 B2  
(45) Date of Patent: Sep. 12, 2006

(54) METHOD FOR DEPLOYING SEAFLOOR EQUIPMENT

(75) Inventors: Francois Luc, Sydney (AU); Robert Dowle, Sydney (AU)

(73) Assignee: Compagnie Generale de Geophysique, Massy (FR)

( * ) Notice: Subject to any disclaimer, the term of this patent is extended or adjusted under 35 U.S.C. 154(b) by 0 days.

(21) Appl. No.: 10/986,437

(22) Filed: Nov. 10, 2004

(65) Prior Publication Data

US 2005/0169713 A1    Aug. 4, 2005

(51) Int. Cl.
*G01V 1/28* (2006.01)

(52) U.S. Cl. .................. 405/158; 405/172; 405/173; 367/15; 181/110; 181/112

(58) Field of Classification Search ............ 405/154.1, 405/156, 158, 168.3, 168.4, 169, 172, 173; 367/15, 20, 21, 133; 181/122, 112, 110, 181/118, 120

See application file for complete search history.

(56) References Cited

U.S. PATENT DOCUMENTS

| 4,398,276 | A | * | 8/1983 | Kruppenbach | ............... | 367/191 |
| 4,450,543 | A | * | 5/1984 | Neeley | ....................... | 367/154 |
| 4,641,287 | A | * | 2/1987 | Neeley | ....................... | 367/19 |
| 4,875,429 | A | | 10/1989 | Murray et al. | ............... | 114/331 |
| 4,913,080 | A | | 4/1990 | Kindem et al. | ............... | 114/250 |
| 5,189,642 | A | | 2/1993 | Donoho et al. | ................ | 367/15 |
| 6,024,344 | A | | 2/2000 | Buckley et al. | ............... | 267/76 |

* cited by examiner

*Primary Examiner*—Sunil Singh
(74) *Attorney, Agent, or Firm*—Connolly Bove Lodge & Hutz LLP

(57) ABSTRACT

A method for deploying and retrieving seafloor equipment modules is disclosed. A conveyor has a fixed end and a free end. The conveyor is deployed into a body of water until the free end reaches, or is proximate to, the seafloor. The conveyor is dragged through the water. The equipment modules are slidably attached to the conveyor. The equipment modules slide along the conveyor to the seafloor, where the equipment modules engage the seafloor and are secured at a fixed position.

29 Claims, 3 Drawing Sheets

METHOD FOR DEPLOYING SEAFLOOR EQUIPMENT

BACKGROUND OF THE INVENTION

1. Priority

Priority is claimed to International Patent Application No. PCT/AU03/00561, filed on May 9, 2003 and published as International Publication No. WO 03/096072 A1 on Nov. 20, 2003, which claims priority to Australian Application No. 2003900266, filed on Jan. 20, 2003, and Australian Provisional Application No. PS2255, filed on May 10, 2002. The disclosures of these priority documents are incorporated herein by reference.

2. Field of the Invention

The present invention relates generally to deploying seafloor equipment, for example seismic recorders for use in marine seismic surveying. While the invention will be described hereinafter with reference to this application, it will be appreciated that the invention is not limited to this particular field of use.

3. Description of the Prior Art

Any discussion of the prior art throughout the specification should in no way be considered as an admission that such prior art is widely known or forms part of common general knowledge in the field.

For various applications it may be necessary to deploy equipment to the seafloor. For example, seafloor recorders are often used for earthquake monitoring or marine seismic operations. These devices are typically referred to as "Ocean Bottom Seismometers" and various descriptions can be found in U.S. Pat. No. 4,692,906 to Neeley (1987), U.S. Pat. No. 5,189,642 to Donoho et al. (1993) and U.S. Pat. No. 5,253,223 to Svenning et al. (1993). Seafloor recorders typically consist of a pressure resistant waterproof container housing: a clock, digital data recording electronics, a battery, three geophones to sense the seafloor movement in all directions and a hydrophone to sense acoustic pressure. They can also be equipped with other means such as a chassis for coupling to the ground, a recovery module usually based on a weight release mechanism to ascend back to the surface, and secondary sensors such as a magnetic heading sensor, a tilt sensor and depth sensor.

Various methods of deploying seafloor recorders have been proposed for applications such as oil exploration geophysics which require very high quality geologic images to be obtained from seismic signals acquired at the seabed. Nevertheless, the imaging requires a reasonable control of the positioning of the sensor during deployment, which is a significant issue in deep water, or in presence of strong currents. For instance, U.S. Pat. No. 5,253,223 to Svenning et al. (1993) disclosed a submarine vessel to deploy the recorders. U.S. Pat. No. 6,244,375 B1 to Norris et al. (2001) disclosed a method using recorders travelling autonomously along predefined paths, such as tubing, laid at the ocean bottom. Those methods require a very significant and expensive infrastructure to be put in place.

U.S. Pat. No. 6,024,344 to Buckley et al. (2000) disclosed a method for recording seismic data in deep water where a plurality of seismic data recorders are attached to a wire stored on a seismic vessel. A free end of the wire is deployed into the water, and the recorders are attached at selected positions along the wire. The wire and recorders are lowered into the water as the vessel moves to control the recorder deployment. The wire controls recorder location and establishes the recorder spacing interval. One significant drawback of this method is that for effective deployment in presence of currents, the density and mass per unit length of the cable and recorders has to be high compared to hydrodynamic drag, which results in a very significant overall weight to be carried by the vessel.

SUMMARY OF THE INVENTION

It is an object of the present invention to overcome or ameliorate at least one of the disadvantages of the prior art, or to provide a useful alternative.

According to a first aspect of the present invention there is provided a method for deploying equipment modules to a seafloor of a body of water, said method including the steps of:

deploying conveying means having a free end reaching, or proximate to, the seafloor;

dragging said conveying means through said water;

slidably attaching one or more of said equipment modules to said conveying means;

releasing said equipment modules such that said equipment modules slide along said conveying means to the seafloor, whereby said equipment modules engage said seafloor so as to secure the equipment modules at a fixed position.

According to a second aspect of the present invention there is provided a method for deploying and retrieving seafloor equipment including the steps of:

providing a conveying means with a fixed end and a free end;

releasing said conveying means into a body of water from a vessel until said free end reaches, or is proximate to, a seafloor of said body of water;

dragging said conveying means behind said vessel at a controllable speed;

slidably attaching said equipment including a recovery module and stopping means to said conveying means, wherein said equipment, said recovery module and said stopping means are secured one to another by a connector;

sliding said equipment to the free end of the conveying means, said equipment being fixed in position on the seafloor by said stopping means once said stopping means reaches the seafloor;

activating said recovery module so as to allow said equipment to ascend from the seafloor to a surface of the water; and retrieving said equipment from the surface of the water.

Preferably the conveying means is in the form of a cable.

According to another aspect of the present invention there is provided a method for deploying equipment modules to a seafloor of a body of water, said method including the steps of:

deploying conveying means having a free end reaching, or proximate to, the seafloor, said conveying means further having an equipment module release mechanism disposed at, or adjacent to, said free end;

dragging said conveying means through said water;

slidably attaching an equipment module to said conveying means;

allowing said equipment module to slide along said conveying means to the equipment module release mechanism;

activating said equipment module release mechanism so as to selectively release said equipment module when said equipment module is at, or close to, a predefined seafloor deployment position; and allowing said equipment module to engage with said seafloor so as to secure the equipment module at a fixed position.

BRIEF DESCRIPTION OF THE DRAWINGS

Preferred embodiments of the invention shall now be described, by way of example only, with reference to the accompanying drawings, in which.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Moreover, while the present invention is illustrated by a number of preferred embodiments directed to ocean bottom systems, it is not intended that these illustrations be a limitation on the scope or applicability of the present invention. Apart from ocean bottom systems, the present invention is also applicable to other applications, such as shallow water operations, for example. Further, various parts of the present invention have not been drawn to scale. Certain dimensions have been exaggerated in relation to other dimensions in order to provide a clearer illustration and understanding of the present invention.

Figure 1A:
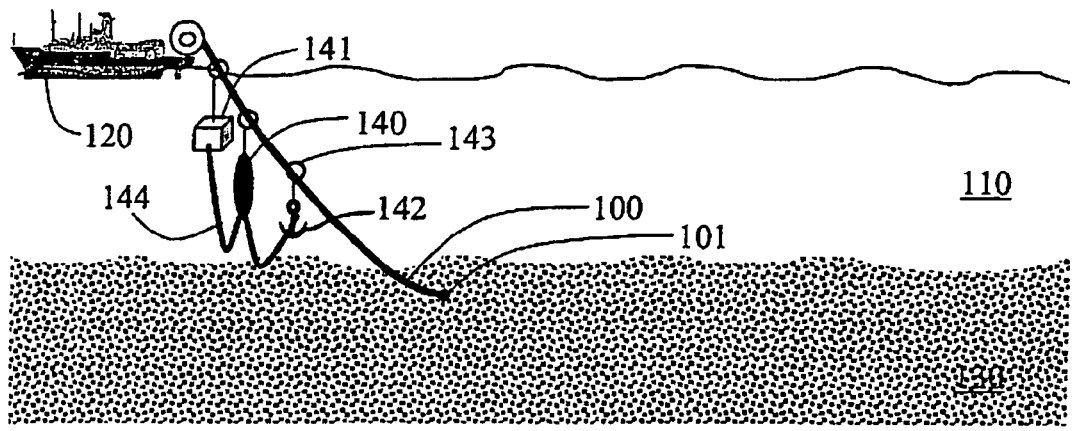
FIGS. 1a to 1c depict the process flow of one embodiment according to the present invention in general overview.
Figure 1B:
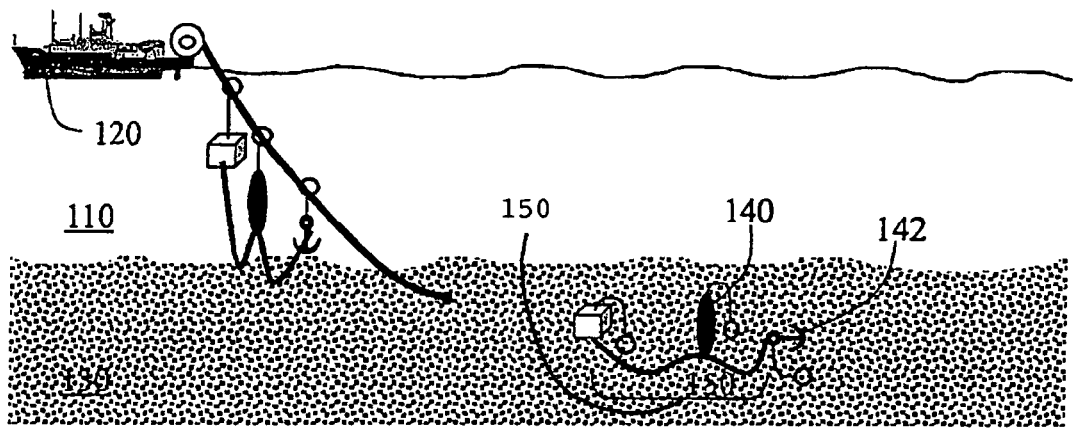
Figure 1C:
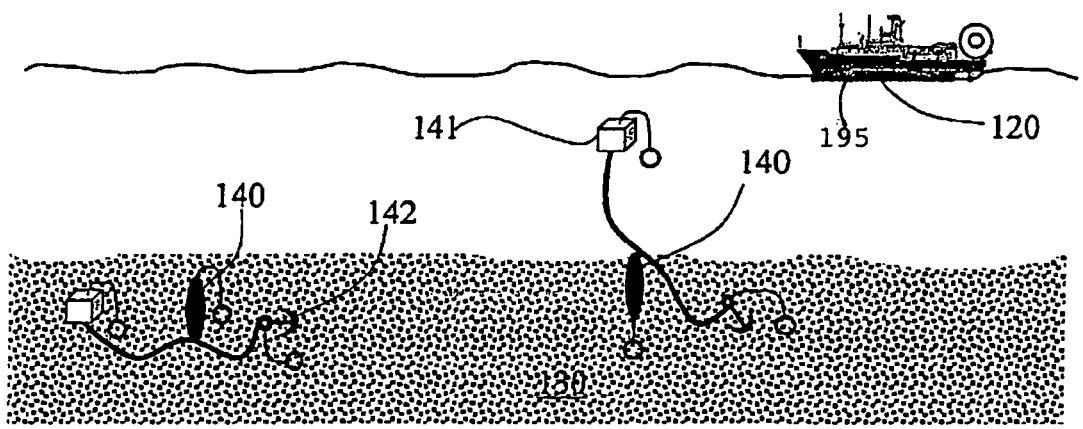

The preferred embodiment of the present invention provides a method for deploying and retrieving equipment such as seismic data recorders from a surface vessel. In some embodiments the equipment takes the form of equipment modules which may include any one or more of the following: seismic sensors and recorders, auxiliary sensors such as heading sensors, positioning sensors, acoustic transponders, and/or other like equipment. Referring initially to FIGS. 1a–1c, illustrated is a process flow of a preferred embodiment according to the present invention in general overview. These drawings merely show several key steps in sequential processes.

Starting from FIG. 1a, the present embodiment includes the steps of, firstly, providing conveying means such as a cable 100 which is typically very long, for example up to a few kilometers. The cable 100 is preferably metallic to combine strength and high density and can feature an outer coating to facilitate sliding.

Secondly, the cable 100 is released into the water 110 from the seismic vessel 120.

Thirdly, the cable 100 is dragged behind the seismic vessel 120 under a controllable speed such that a free end 101 of the cable 100 reaches, or is proximate to the seafloor 130. As used in this document, the term "seafloor" refers to the bottom 130 of any body of water 110.

Fourthly, a plurality of equipment modules 140, 141 and 142 are slidably attached to the cable 100, for example by using clips 143 which preferably include a snap-link. The equipment modules may include any one or more of:

one or more seismic data recording units 140, each having sensors, clocks and associated electronics;

a recovery module 141, for example including buoyancy means; and/or stopping means 142, such as an anchor, used to maintain the equipment modules at fixed positions once they reach the seafloor 130.

Any two or more of the above mentioned equipment modules 140, 141 and 142 may be bound together by a connector 144 which provides a mechanical link 144, such as high tensile strength fibre, eg Kevlar or Vectran. However, before attaching the recording units 140 to the cable 100, the recorders should be initialized and the clocks synchronized. The purpose of the mechanical link 144 relates solely to recovery of the modules 140, 141 and 142. During decent and whilst on the seafloor, the mechanical link 144 is slack. This helps to avoid vibrational coupling between adjacent recorders which could result in false readings.

Fifth, the equipment modules are deployed by allowing the clips 143 to slide along the cable 100, thereby dropping from the vessel 120 down to the seafloor 130. Once released, the equipment modules 140, 141 and 142 are forced downwardly by the combined action of the profile of the cable 100 and the hydrodynamic drag on the equipment modules caused by the dragging of the cable 100 through the water. Once the equipment modules 140,141 and 142 reach the seafloor 130, the measurement and recording of seismic data may commence.

The fixed position 150 of the equipment modules 140,141 and 142 on the seafloor 130, as shown in FIG. 1b, is dependent upon a number of factors such as:

the position of the vessel 120 at the time of release of the equipment modules 140,141 and 142;

the speed at which the equipment modules 140, 141 and 142 descend along the cable 100 (which, in turn, is dependent upon the speed at which the cable 100 is dragged through the water behind the vessel 120, the density of the equipment modules 140,141 and 142, the profile of the cable 100, any currents that may exist at various depths within the body of water 120, etc);

any friction that may exist between the cable 100 and the clip 143; and the depth of the water 110.

Advantageously the preferred embodiment of the present invention makes use of known methods for controlling cable deployment to the bottom of the sea, for example methods used in the art of laying intercontinental communications cables. Such known methods include the use of:

Global Positioning Systems (GPS) to determine the position the vessel 120;

Acoustic Doppler Current Profilers (ADCP) to obtain a map of the variation of current direction and amplitude in the water column under the vessel 120; and/or Ultra-short acoustic base to obtain the position of a transponder relative to the ship 120 to within an accuracy of between 1.5% to 0.5% of the water depth.

When the bathymetry (ie geometry of the sea bottom 130) is known, the profile of the cable 100 can be calculated from a knowledge of hydrodynamic coefficients of the cable 100 and its mechanical properties combined with data from the GPS and ADCP. Acoustic transponders can also be used to check or refine calculations. This equipment is advantageously employed in conjunction with software programs which give navigational advice to the ship 120 in order to optimize the control of the deployment.

Hence accurate positioning of the equipment modules 140,141 and 142 on the seafloor 130 requires monitoring of the above factors and precise control of the timing of the release of each equipment module. Preferably the release of equipment modules 140, 141 and 142 from the vessel 120 is controlled by a mechanical latch system. This advantageously allows for accurate control of the moment at which each module is released.

Preferably the variables which impact upon the ultimate positioning of the equipment 140, 141 and 142 upon the seafloor 130 are controlled sufficiently for placement of the equipment 140,141 and 142 in a position 150 on the seafloor 130 to within an accuracy of approximately 1.5% of the depth of the water. Some embodiments of the present invention can provide positioning to within an accuracy of approximately 0.5% of the depth of the water. Such accuracy compares favourably to the majority of the prior art methods for deploying equipment to a seafloor environment at depths of thousands of meters.

The separation distance between the fixed positions 150 of two adjacent groups of equipment modules 140, 141 and 142 on the seafloor 130 is also dependent upon the above mentioned factors. Hence the separation between adjacent equipment modules 141 can also be controlled by precise timing of their release from the vessel 120 in conjunction with monitoring of the other relevant factors.

The final step in the first preferred method is ascent of the equipment modules 140, 141 and 142 and their retrieval from the surface of the water 110. Ascent of a given equipment module commences upon activation of the recovery module 141 which causes the recovery module 141 to ascend back to the surface of the water. The mechanical link 144 ensures that the recording unit 140 and the anchor 142 accompany the recovery module 141 in the ascent to the surface. At this point the equipment modules 140, 141 and 142 can be collected by the same vessel 120 or by another vessel. Upon retrieval, any data recorded and stored by the recording unit 140 can be downloaded and the battery reloaded if necessary.

For applications such as oil exploration geophysical surveys, an acoustic source 195, such as air-guns or marine vibrators, can be used for acoustic illumination. The acoustic source may be disposed on a vessel 120, as shown in FIG. 1c, or deployed onto the cable 100 in accordance with another preferred embodiment. Once all the equipment modules 140, 141 and 142 have been retrieved, the deployment cycle starts again.

Figure 2A:
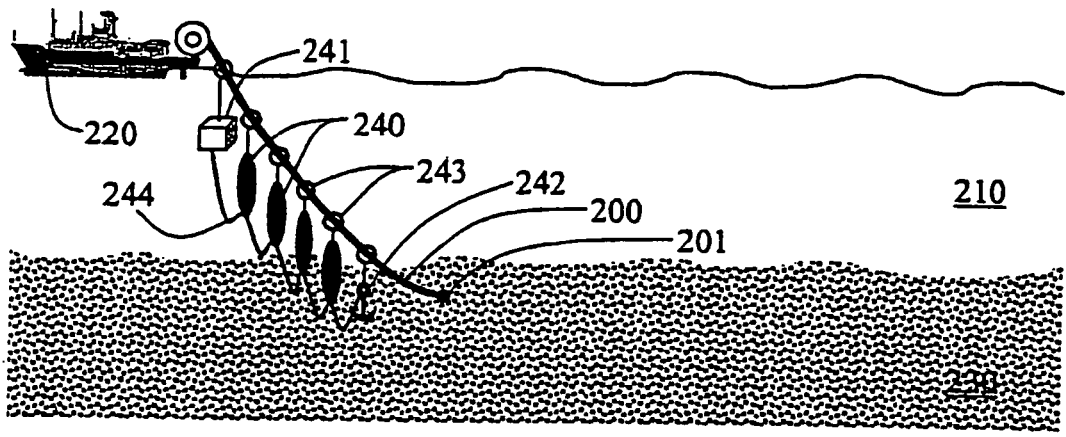
FIGS. 2a to 2c depict the process flow of a second embodiment according to the present invention in general overview.
Figure 2B:
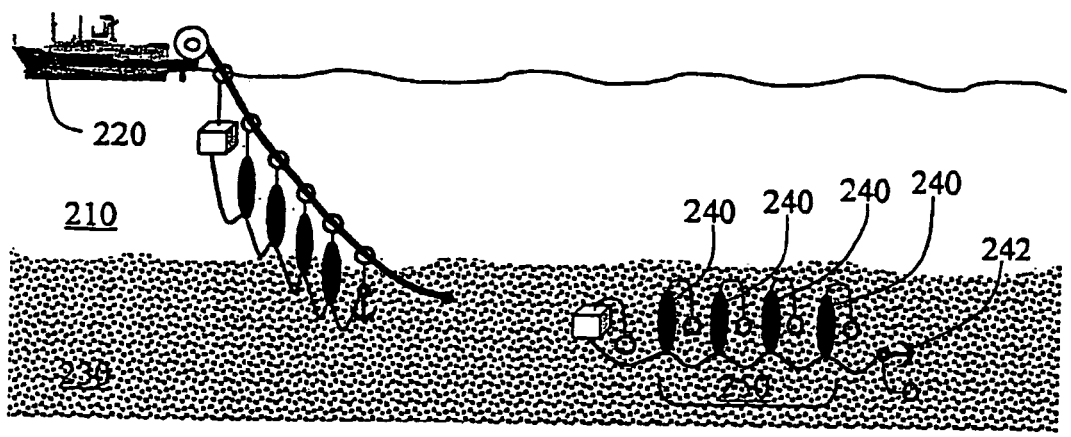
Figure 2C:
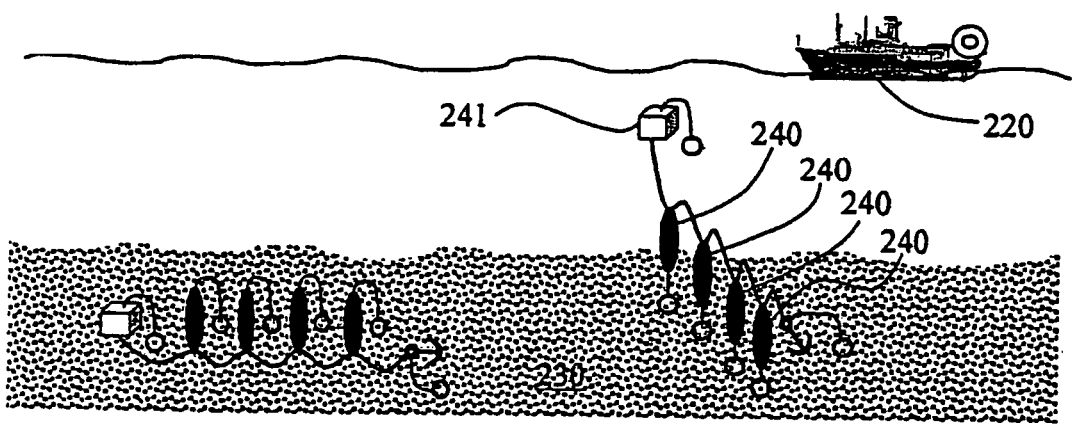

Referring now to FIG. 2a–FIG. 2c, illustrated is a process flow of an alternate embodiment according to the present invention in general overview. These drawings merely show several key steps in sequential processes.

Starting from FIG. 2a, the present embodiment includes the steps of, firstly, providing conveying means such as a cable 200 with a fixed end and a free end 201. Preferably the cable 200 is comparatively heavy to ensure that it adopts a reliable profile when hanging from the vessel 220.

Secondly, releasing the cable 200 into water 210 from a vessel 220 until the free end 201 of the cable 200 reaches, or is proximate to, the bottom 230 of the water 210.

Thirdly, dragging the cable 200 behind the vessel 220 under a controllable speed. Ideally the length of the cable 200 is just sufficient for the cable to touch the bottom 230 and perhaps drag over a few tens of meters.

Fourth, slidably attaching equipment, including a plurality of recorder units 240, a recovery module 241, and stopping means 242 such as an anchor, to the cable 200. The ratio of recorder units 240 to ancillary equipment (such as recovery modules 241 and anchors 242) in the preferred embodiment illustrated in FIGS. 2a to 2c is higher than that shown in FIGS. 1a to 1c. This generally allows for more economic deployment of a large number of recorder units 240 as it is not necessary to provide a recovery module 241 and an anchor 242 for each recorder unit 204.

The slidable attachment may be provided by clips 243 which are designed to slide along the cable 200, and can, for instance, consist in a snap-link and a rope. The recorder units 240, the recovery module 241 and the stopping means 242, are tethered together by a connector 244, such as a rope. Preferably the rope 244 is made from a light material, such as a high tensile strength low-density fibre, for example Kevlar or Vectran. Use of a connector 244 allows deployment and retrieval of a plurality of equipment modules, for example many seismic recording units 240, at the same time. However, before slidably attaching the seismic recording units 240 to the cable 200, the recording units 240 are preferably initialized and their clocks synchronized.

The recovery module 241 may take the form of a pop-up buoy, or a combination of a buoy, a weight and a weight release mechanism. Some embodiments of the recovery module are automatically activatable, for example by a timer. Alternatively, the recovery module may be remotely activatable, for example upon detection of a signal, such as an acoustic signal.

Fifth, deploying the equipment including the recorder units 240, the recovery module 241 and the stopping means 242, by allowing the equipment to slide along the cable 200 and thereby drop from the vessel 220 down to the bottom 230 of the water 210. In this case, the equipment is forced to the bottom 230 by the combined action of the shape of the heavy cable 200, the drag of the water and the weight of the equipment. With reference to FIG. 2b, once the equipment reaches the bottom 230, the equipment is maintained in contact with the seafloor 230 at a fixed position 250 by the stopping means 242 and due to the weight of the equipment. Whilst deployed on the seafloor, the rope 244 between equipment modules remains slack. This assists to avoid undesirable vibrational coupling between adjacent recording units 240.

Precise timing of the dropping of the equipment is provided by a mechanical latch system. The positioning of the equipment on the seafloor, and the separation distance between adjacent equipment, is dependent upon the same factors as outlined above in relation to the first embodiment.

Sixth, causing the equipment to ascend and retrieving the equipment. This is best illustrated in FIG. 2c. When the time comes for the equipment to ascend, the recovery module 241 is activated. In one embodiment activation of the recovery module 241 occurs once a timer indicates that a predetermined length of time has elapsed. In another embodiment the recovery module 241 is adapted to activate upon detection of a signal. Upon activation, one embodiment of the recovery module 241 activates a weight release mechanism. In another embodiment, activation of the recovery module causes inflation of a membrane. In any event, upon activation the recovery module 241 assumes a positive buoyancy sufficient for the ascension of the equipment from the seafloor 230 to the surface of the water. Finally, the equipment is retrieved from the surface of the water.

Immediately after deployment, the same vessel 220 can be used to illuminate the area with an acoustic source and then to collect the data recorders 240 once the recovery modules 241 have been triggered. Alternatively, another vessel can be used for acoustic illumination and/or recovery.

Advantageously the preferred embodiments provide very good control of the positioning of comparatively light equipment due to the use of a heavy cable 200.

In preferred embodiments, positioning means, such as acoustic transponders and auxiliary sensors, can be deployed by being tethered to the equipment modules In another embodiment such positioning means are slidably attached to the cable and then deployed and retrieved using the same method as for the equipment modules.

Figure 3A:
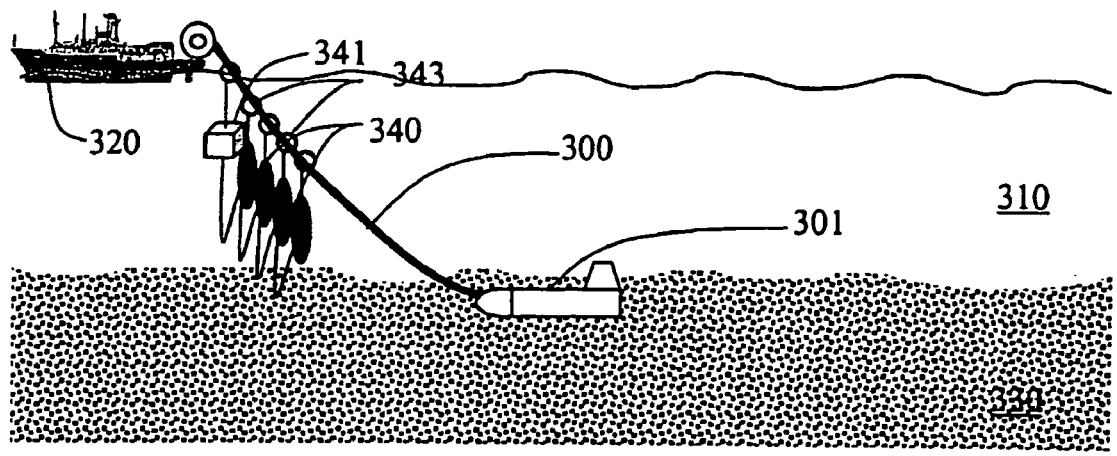
FIGS. 3a to 3c depict the process flow of another embodiment according to the present invention in general overview.
Figure 3B:
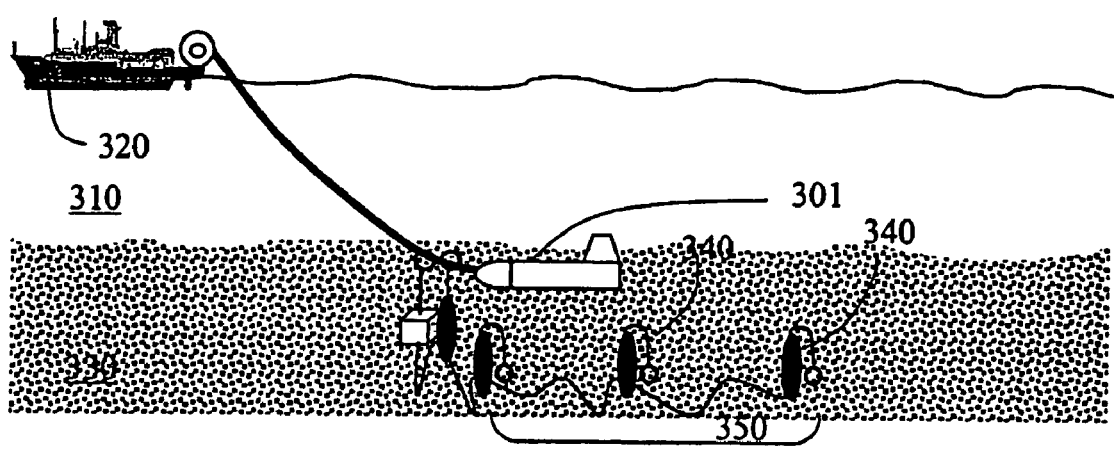
Figure 3C:
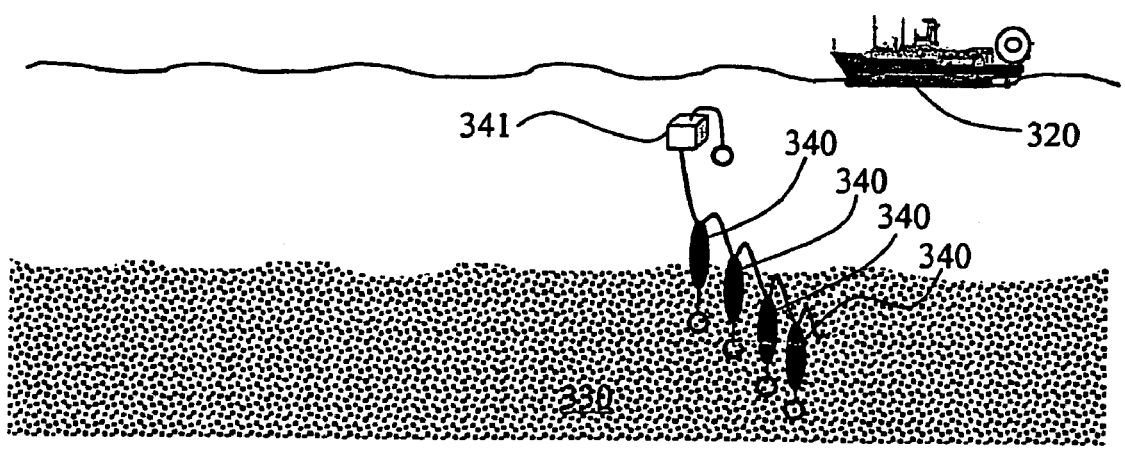

Referring now to FIG. 3a–FIG. 3c, illustrated is a process flow of a third embodiment according to the present invention in general overview. These drawings merely show several key steps in sequential processes.

Starting from FIG. 3a, the third embodiment includes the steps of, first, providing conveying means such as a cable 300 with a fixed end and a free end equipped with a towed vehicle 301 which includes an equipment release mechanism, for example an electromagnetically actuatable latch.

Second, the cable 300 is released into water 310 from a seismic vessel 320 until the towed vehicle 301 approaches the bottom 330 of the water 310. Third, the cable 300 is dragged behind the seismic vessel 320 under a controllable speed. The length of the cable 300 is controlled to what is needed for the towed vehicle to approach the bottom 330 within a few meters. The location of the towed vehicle 301 may be precisely measured by using an ultra short acoustic base located on the vessel 320 and an acoustic transponder fixed onto the towed body 301.

Fourth, equipment modules, such as a plurality of seismic recording units 340 and a recovery module 341, are attached to the cable 300 by using a clipping system 343 which is designed to slide along the cable 300 and can, for instance, consist in a snap-link and a rope. Before attaching the seismic recording units 340 to the cable 300, the recording units need to be initialized and clocks need to be synchronized.

The equipment modules are secured one to another by connecting means 344, such as a rope, which allows retrieval of many seismic recording units 340 with a single recovery module 341. The rope 344 may be comparatively light weight through the use of high tensile strength low-density fibre such as Kevlar or Vectran, for instance. It is important that the rope length between adjacent equipment modules is longer than the intended deployment spacing between adjacent modules on the seafloor, so that the rope lies slack on the bottom and no vibrational coupling occurs between adjacent recording units 340 that might otherwise detrimentally affect the quality of the seismic data stored by the recording units.

The recovery module 341 can consist in a pop up buoy or can be made of a buoy, a weight and a weight release mechanism, which can be activated by a timer or remotely.

Fifth, the equipment modules 340 and 341 are deployed by allowing the clippings 343 to slide along the cable 300 and so as to descend from the seismic vessel 320 down to the towed vehicle 301. In this case, the equipment modules 340 and 341 are forced towards the bottom 330 by the combined action of the shape of the heavy cable 300, their hydrodynamic drag in the water and their negative buoyancy. Once the equipment modules 340 have reached the towed vehicle 301, they are restrained at, or adjacent to, the free end of the cable 300 by the electromagnetically actuatable latch until the equipment modules 340, 341 are in, or close to, an intended seafloor deployment position. At this point in time, as shown in FIG. 3b, one or more equipment modules 340 and/or 341 are released by the electromagnetically actuatable latch and allowed to sink to the bottom 330 at fixed deployment positions 350. Precise timing and location of the dropping of each equipment module 340 and/or 341 can be controlled from the vessel 320 by communication of a signal from the vessel 320 to the towed vehicle 301, either electrically through a conductor in cable 300 or acoustically through the water 310. Upon receipt of the signal, the electromagnetically actuatable latch releases one or more of the equipment modules 340 and/or 341.

Sixth, referring now to FIG. 3c, the recovery module 341 is activated by either a timer, remotely or by any other means for allowing the equipment modules 340 and 341 to ascend from the bottom 330 to the surface of the water. The rope 344 ensures that the recorder units 340 ascend with the recovery module 341. Finally, the equipment modules 340 and 341 are retrieved from the surface of the water.

The present embodiment allows fulfillment of complex deployment geometry. Immediately after deployment, the same vessel can be used to illuminate the area with an acoustic source and then collect the data recorders 340 once the recovery modules 341 have been triggered. Alternatively, another vessel can be used for acoustic illumination and/or recovery.

The preferred embodiments advantageously allow for very good control of the positioning of equipment modules using a considerably lighter system for a given positioning performance.

Although specific embodiments have been illustrated and described, it will be obvious to those skilled in the art that various modifications may be made without departing from what is intended to be limited solely by the appended claims.

The invention claimed is:

1. A method for deploying at least one equipment module to a seafloor of a body of water, said method including the steps of:
    deploying conveying means having a free end reaching, or proximate to, the seafloor;
    dragging said conveying means through said water;
    slidably attaching said at least one equipment module to said conveying means;
    releasing said at least one equipment module such that said at least one equipment module slides along said conveying means, past said free end such that said at least one equipment module detaches from said conveying means, and onto the seafloor, whereby said at least one equipment module engages said seafloor so as to secure the at least one equipment module at a fixed position.

2. A method according to claim 1, wherein said at least one equipment module is slidably attached to said conveying means by at least one clip.

3. A method according to claim 1, wherein said at least one equipment module includes at least one recording module having seismic data recording means.

4. A method according to claim 3, further including the steps of initialising said seismic data recording means and synchronising clocks disposed in said at least one recording module before the step of attaching said at least one equipment module to the conveying means.

5. A method according to claim 1, wherein said at least one equipment module includes a stopping means adapted to engage the seafloor so as to secure at least one equipment module at a fixed position.

6. A method according to claim 1, wherein two or more equipment modules are slidably attached to said conveying means and any two of said equipment modules are secured to each other by a connector.

7. A method according to claim 1, further including the step of providing a second vessel to carry out a step of retrieving said at least one equipment module.

8. A method according to claim 1, wherein a plurality of equipment modules are slidably attached to said conveying means and a separation distance between two of said equipment modules when deployed onto the seafloor is at least in part determined by a speed of a deployment vessel and a time of deployment.

9. A method according to claim 1, wherein an equipment module release mechanism is disposed at, or adjacent to, said free end of said conveying means.

10. A method according to claim 9, wherein said equipment module release mechanism includes a latch.

11. A method according to claim 10, wherein said latch is electromagnetically actuatable.

12. A method according to claim 9, wherein said equipment module release mechanism is actuatable in response to a signal so as to release said at least one equipment module.

13. A method according to claim 12 further including the step of transmitting said signal to said equipment release module when an equipment module is at or close to a required seafloor deployment position.

14. A method according to claim 9, wherein a plurality of equipment modules are slidably attached to said conveying means, and said equipment module release mechanism is actuatable in response to a signal so as to release one or more of said equipment modules.

15. A method according to claim 1, wherein said conveying means comprises a cable.

16. A method for deploying equipment modules to a seafloor of a body of water, said method including the steps of:
    deploying conveying means having a free end reaching, or proximate to, the seafloor;
    dragging said conveying means through said water;
    slidably attaching said eguipment modules to said conveying means;
    releasing said equipment modules such that a first equipment module slides along said conveying means to the seafloor, whereby said first equipment module engages said seafloor so as to secure the first equipment module at a fixed position, and wherein a second equipment module is a recovery module activatable so as to cause the equipment modules to ascend from the seafloor.

17. A method according to claim 16, wherein activation of said recovery module is accomplished by a timer.

18. A method according to claim 16 wherein activation of said recovery module is accomplished by a remote controller.

19. A method for deploying and retrieving seafloor equipment including the steps of:
    providing a conveying means with a fixed end and a free end;
    releasing said conveying means into a body of water from a vessel until said free end reaches, or is proximate to, a seafloor of said body of water;
    dragging said conveying means behind said vessel at a controllable speed;
    slidably attaching said equipment, along with a recovery module and stopping means, to said conveying means, wherein said equipment, said recovery module and said stopping means are secured one to another by a connector;
    sliding said equipment to the free end of the conveying means, said equipment being fixed in position on the seafloor by said stopping means once said stopping means reaches the seafloor;
    activating said recovery module so as to allow said equipment to ascend from the seafloor to a surface of the water; and
    retrieving said equipment from the surface of the water.

20. A method according to claim 19, further including the steps of initializing recording means and synchronizing clocks included within said equipment before the step of attaching said equipment to the conveying means.

21. A method according to claim 19, further including the step of repeating the sequence of steps from the step of dragging said conveying means behind said vessel to the step of retrieving said equipment.

22. A method according to claim 19, wherein said position of equipment on the seafloor is at least in part determined by said controllable speed of said vessel and a time of deployment of said equipment.

23. A method according to claim 19, wherein the step of activating said recovery module is accomplished by a timer.

24. A method according to claim 19, wherein the step of activating said recovery module is accomplished by a remote controller.

25. A method according to claim 19, wherein said conveying means is provided by a plurality of cables which are released and dragged in parallel by the same vessel.

26. A method for deploying at least one equipment module to a seafloor of a body of water, said method including the steps of:
    deploying conveying means having a free end reaching, or proximate to, the seafloor, said conveying means further having an equipment module release mechanism disposed at, or adjacent to, said free end;
    dragging said conveying means through said water;
    slidably attaching said at least one equipment module to said conveying means;
    allowing said at least one equipment module to slide along said conveying means to the equipment module release mechanism;
    activating said equipment module release mechanism so as to selectively release said at least one equipment module when said at least one equipment module is at, or close to, a predefined seafloor deployment position; and
    allowing said at least one equipment module to engage with said seafloor so as to secure said at least one equipment module at a fixed position.

27. A method according to claim 26, wherein said equipment module release mechanism includes a latch.

28. A method according to claim 27, wherein said latch is electromagnetically actuatable in response to a signal.

29. A method according to claim 26 including the steps of:
    allowing a plurality of equipment modules to slide along said conveying means to the equipment module release mechanism; and
    activating said equipment module release mechanism so as to selectively release one or more of said equipment modules at, or close to, respective predefined seafloor deployment positions.

* * * * *